United States Patent
Fabre et al.

(10) Patent No.: US 6,405,186 B1
(45) Date of Patent: Jun. 11, 2002

(54) METHOD OF PLANNING SATELLITE REQUESTS BY CONSTRAINED SIMULATED ANNEALING

(75) Inventors: Benoît Fabre, Longjumeau; Fabrice Noreils, Orsay; Marie Berger, Paris, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/035,038

(22) Filed: Mar. 5, 1998

(30) Foreign Application Priority Data

Mar. 6, 1997 (FR) .............................. 97 02675

(51) Int. Cl.[7] ................................. G06N 7/00

(52) U.S. Cl. .......................... 706/45; 706/46; 706/47; 706/48

(58) Field of Search ............................ 706/45, 46, 47, 706/48, 23, 24, 19

(56) References Cited

U.S. PATENT DOCUMENTS 5,623,413 A * 4/1997 Matheson et al. .......... 364/436
5,794,172 A * 8/1998 Matheson et al. .......... 701/117
5,850,617 A * 12/1998 Libby ........................ 701/202

OTHER PUBLICATIONS

Shapiro, Stuart C., Encyclopedia of Artificial Intelligence, Second Edition, vol. 2, John Wiley & Sons, Inc., pp. 1538–1541, Jan. 1992.*

Nichols, R.A.; Moy, D.W.; Pattay, R.S., A fast algorithm for optimal satellite spot beam pointing, Aerospace and Electronic Systems, IEEE Transactions on vol.: 32 3 , Jul. 1996, pp.: 1197 –1202.*

Bhide, S.; John, N.; Kabuka, M.R., A Boolean neural network approach for the traveling salesman problem, Computers, IEEE Transactions on, vol.: 42 10 , Oct. 1993 , pp.: 1271 –1278.*

W. T. Scherer et al, "Combinatorial Optimization for Spacecraft Scheduling" Proceedings of the 4th International Conference on Tools with Artificial Intelligence (TAI), Arlington, VA Nov. 10–13, 1992, IEEE, pp. 120–127, XP000357245.

(List continued on next page.)

*Primary Examiner*—Mark Powell
*Assistant Examiner*—Wilbert Starks
(74) *Attorney, Agent, or Firm*—Sughrue, Mion, Zinn, Macpeak & Seas, PLLC

(57) ABSTRACT

An iterative method enabling a request plan to be established for an observation satellite. A plan consists in a succession of requests which are associated with pluralities of opportunities for satisfying said requests. The plan must also comply with a plurality of constraints. Each iteration k of the iterative method is made up of the following steps:

new opportunity is selected;

a provisional plan is derived from the preceding plan k-1 as calculated in the preceding iteration, and from the new opportunity;

provisional plan is verified for compliance with said plurality of constraints;

the quality of said provisional plan is evaluated; and it is determined whether the provisional plan should be confirmed as plan k as a function of the quality of said provisional plan and of the quality of said preceding plan k-1.

In the method, it is decided whether or not to confirm the provisional plan by a probabilistic metaheuristic of the simulated annealing type, and by the rule for constructing the provisional plan as a function of the newly selected opportunity.

14 Claims, 2 Drawing Sheets

OTHER PUBLICATIONS

J.C. Agnese et al, "Exact and approximate methods for the daily management of an Earth observation satellite", Proceedings of 5th Workshop for Artificial Intelligence and Knowledge Based Systems for Space, Noordwijk, Netherlands, Oct. 10–11, 1995, ESA, Paris, France, pp. 93–107, XP002046523.

C. Prins, "Duex Problems d'Ordonnancement en telecommunications par Satellite", Revue Francaise D'Informatique et de Recherche Operationalle Serie Verte, vol. 25, No. 3, 1991, pp. 341–358, XP000677576.

\* cited by examiner

METHOD OF PLANNING SATELLITE REQUESTS BY CONSTRAINED SIMULATED ANNEALING

The present invention relates to a method of planning the various picture-taking requests made of an observation satellite fitted with various sensors (radar, infrared, or optical).

BACKGROUND OF THE INVENTION

A picture-taking request is a particular request coming from a particular customer concerning a particular observation (i.e. a shot of a determined region of the earth).

In general, observation satellites are non-sysnchronous, i.e. their orbital period is such that a particular region of the earth can be observed by a particular satellite at several different instants. The term "opportunity" is used below to designate each possible instant available to a satellite for complying with a given request.

A request may consist in taking a plurality of shots of the same region, e.g. in order to construct a stereoscopic view. It then becomes necessary to provide a plurality of opportunities for the same request in order to satisfy it. A request is said to be "saturated in opportunities" when all of the requested shots have been planned.

In addition, there exist certain constraints that make certain opportunities unsuitable.

Generally, a client making a precise request will specify a limit date before which the client desires the request to be implemented. As a result, the number of opportunities for any given request is limited.

Similarly, it may be known a priori that certain opportunities will be impossible because of bad weather conditions. This constraint applies only to optical sensors.

In addition, a satellite may have requests corresponding to making observations of regions of the earth that are very close together. Because of the limited number of on-board sensors, the satellite may not necessarily be capable of processing all of the observations. Consequently, some of the requests will need to be processed at a later time when the satellite is again passing over the zone in question. In other words, selecting a particular opportunity for one request denies opportunities for other requests.

Also, the satellite must send the images it has taken to ground stations by telemetry. Communication between the satellite and the station is possible only during a short "visibility" period. In addition, communication takes place at a limited data rate, such that the satellite must have a memory that acts as a buffer for storing data before it is transmitted. Since the weight of a satellite is a major design constraint, the amount of memory is limited, and consequently certain request opportunities become impossible to satisfy because of insufficient memory availability.

An additional constraint may be that of communicating the data that results from a request only to a station that is situated in the territory of the country that has made the request. Certain requests can be of a confidential nature (e.g. observations of military sites) and must be retransmitted only to sites approved by the person making the request.

Another constraint can also be that of sharing requests as a function of the client and of the financial contribution that the client has invested in the satellite. The proportion of requests fulfilled per nation must correspond approximately to the proportions of the financial contributions made by those nations.

The planning problem which the present invention seeks to solve is that of scheduling the various requests so as to optimize a given evaluation criterion (planned number of requests, total area corresponding to planned requests, total volume corresponding to planned requests, . . . ) while taking account of the various constraints.

In general, such a planning problem is a part of the class of problems known as "NP-complete". For a full discussion of NP-complete problems, the reader may refer to the work "Intelligence artificielle et informatique théorique" [Artificial intelligence and theoretical computing] by Jean-Marc Alliot and Thomas Schiex, published by Cépaduès Editions, and more particularly Chapter 11 thereof dealing with complexity theory, or to the English language work "Computers and intractability: a guide to the theory of NP-completeness" by Garey and Johnson published by Freeman, 1979.

It is important to observe that a problem of this type is of complexity which increases in non-polynomial manner with increasing size of problem, i.e. in the present case with increasing number of opportunities to be planned.

Consequently, the problem becomes one of finding a good solution and not necessarily the best solution.

There is no point in making an exhaustive list of the very numerous methods that seek to solve problems of this kind. Nevertheless, by way of example, mention can be made of approaches of the "constraint propagation" type which have been applied to planning observation satellite requests. By way of example, the reader may refer to the article "Exact and approximate methods for the daily management of an earth observation satellite" by J. C. Agnèse, N. Bataille, D. Blumstein, E. Bensana and G. Verfaillie published in a "Artificial Intelligence and Knowledge Based Systems for Space—5th Workshop", by the European Space Agency.

Mention may also be made of the particular case of the SPOT observation satellite, where planning is performed by an expert system.

Nevertheless, those various solutions do not give very good plans (i.e. the number of planned requests is not very high) and above all they require enormous amounts of computation time before giving an acceptable plan. For example, an implementation of a constraint propagation tape method takes several hours of computation to produce a plan that implements about 70% of the requests in a set of 10,000 requests and 200,000 opportunities.

OBJECT AND SUMMARY OF THE INVENTION

The object of the present invention is to propose a method which gives a request plan that is of better quality than known plans and to do so in a shorter length of time. Typically, for the same example as that mentioned above, the method of the invention gives a plan that satisfies about 80% of the requests and it does so in only a few minutes on a computer of conventional type.

In addition, insofar as the method of the invention is fast enough, it becomes possible to generate plans up to a horizon of several months, which has the particular advantage of improving plan quality.

The method of the invention is an iterative method in which each iteration k is made up of the following steps:
  selecting a new opportunity;
  drawing up a provisional plan from the plan k-1 calculated at the preceding iteration and from said new opportunity;
  verifying that said provisional plan satisfies the constraints;

evaluating the quality of said provisional plan; and determining whether the provisional plan should be accepted as the plan k as a function of the quality of said provisional plan and the quality of said plan k-1 calculated at the preceding iteration;

wherein said provisional plan is confirmed or not by performing a probabilistic metaheuristic of the simulated annealing type.

As with any iterative method, it is important to specify the initial condition of the method and also the stop condition(s).

The initial plan is preferably an empty plan, but it is also possible to precalculate a non-empty initial plan prior to applying the above-mentioned algorithm thereto.

The stop conditions of the algorithm are constituted by conditions that are conventional for this type of iterative algorithm, such as computation time, number of iterations, or the absolute value of the difference in quality between the plan at iteration k and the plan at iteration k-1 dropping below a certain threshold, for example.

It is also possible to add conditions specific to simulated annealing, such as the temperature dropping beneath a certain threshold (different from the first threshold), for example. The notion of "temperature" is explained below.

Naturally, it is also possible to use other stop conditions or to combine a plurality of stop conditions, while still remaining within the ambit of the present invention.

BRIEF DESCRIPTION OF THE DRAWINGS

The invention, its characteristics, and advantages appear more clearly from the following description given with reference to the accompanying figures, in which.

MORE DETAILED DESCRIPTION

In general, simulated annealing is a metaheuristic which applies to any algorithm that solves a problem in iterative manner and which can be reduced to a problem of optimizing a function of one or more variables.

In other words, simulated annealing can be considered as being a method of controlling an iterative algorithm.

The general principle is to accept a solution $S_{k+1}$ even if the new solution is no better than the preceding solution $S_k$ as a function of a probabilistic relationship that decreases with time.

Figure 2:
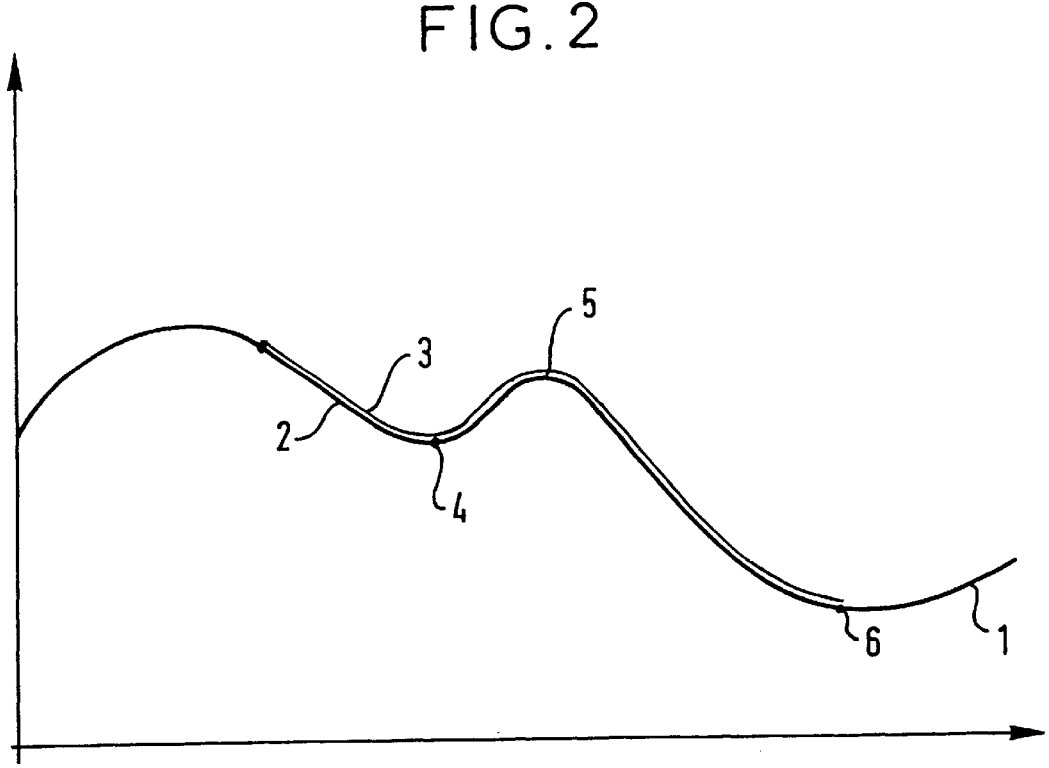
FIG. 2 shows an example of the general principle of simulated annealing (it is a curve of a function to be optimized).

The principle of simulated annealing can be understood quite easily by looking at the example shown in FIG. 2. The problem posed in this case to find the minimum of a function 1.

A first approach consists in moving down a gradient, i.e. starting from a given point (possibly selected in random manner), and from said point, selecting the direction in which the downward slope is steepest. Reference 2 shows the path travelled by successive solutions using that approach.

It will be observed that the method is trapped in a local minimum 4 since on either side of this minimum the gradient is positive.

The simulated annealing type method that is used as an illustration behaves overall in a similar manner, and it too moves down the gradient of curve 1. However, on reaching the local minimum 4, and because of the above-specified rule, a less good solution has some chance of being accepted: in other words, there exists a probability that the curve 3 representing the solutions of the method implementing simulated annealing will rise up the curve and escape from the local minimum 4, and thus find a better solution 6 by passing over a peak 5.

This method is abundantly described in the scientific literature, and a reader seeking to learn more about "simulated annealing" type techniques can refer, for example, to the work: "Simulated annealing and Boltzmann machine: a stochastic approach to combinatorial optimization neural computing" by Emile Aarts and Jan Korst published by John Wiley and Sons.

Figure 1:
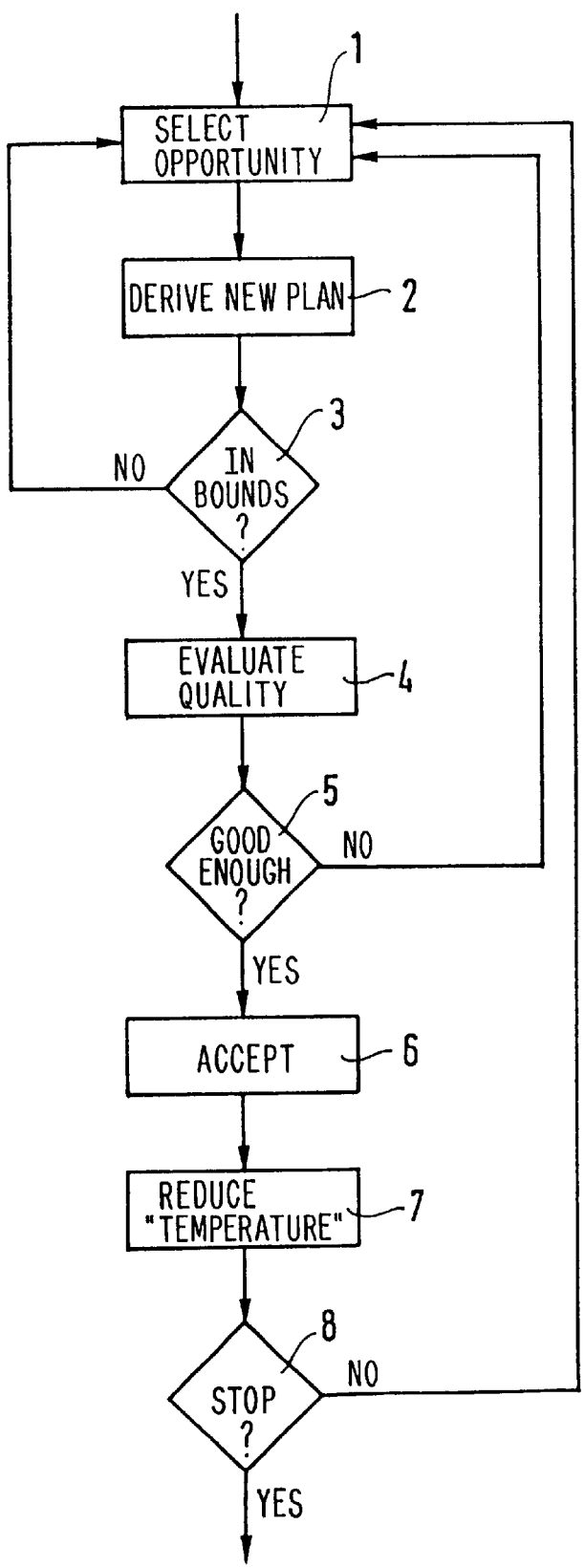
FIG. 1 is a highly diagrammatic flow chart of the method the invention.

In our case, the method consists in optimizing a function that represents the quality of the plan. This quality function E (also called "energy" or "cost") is calculated during the step referenced 4 in FIG. 1. It can be expressed as follows:

$$E_k = \alpha \cdot N_{requests} + \beta \cdot S_{total} + \chi \cdot V_{total}$$

where:

$E_k$ is the quality function at iteration k;

$N_{requests}$ is the number of requests satisfied;

$S_{total}$ is the total area of requests satisfied; and $V_{total}$ is the total volume of requests satisfied.

The parameters $\alpha$, $\beta$, and $\chi$ are fixed by the user. This expression for the cost function is given purely by way of example, and the person skilled in the art can provide different formulations and criteria for measuring the quality of a plan without thereby going beyond the scope of the present invention.

The step referenced 5 constitutes the core of the simulated annealing method. It consists in determining whether or not the provisional plan is to be accepted, as a function in particular of a probabilistic relationship. Two situations can arise:

The quality $E_p$ of the provisional plan is better than the quality $E_{k-1}$ of the plan previously calculated at iteration k-1: under such circumstances, the provisional plan is accepted and it becomes plan k.

The quality $E_p$ of the provisional plan is worse than the quality $E_{k-1}$ of the plan previously calculated at iteration k-1: under such circumstances, the probability that the plan will nevertheless be accepted and become plan k is given by the following expression:

$$P = e^{\Delta/T}$$

where $\Delta = E_p - E_{k-1}$ ($\Delta < 0$) and T is a magnitude conventionally called "temperature" by reference to Boltzmann's law in the field of statistical physics, which is the field from which the simulated annealing metaheuristic is inspired.

The step referenced 6 is the step where the provisional plan is actually accepted. This step is performed only as a function of the decision made in preceding step 5.

The step referenced 7 consists in decreasing the temperature T, monotonically towards 0. T is preferably decreases in steps, e.g. by being multiplied by 0.99 after a certain number of iterations. As a result, the probability P tends towards 0 (since $\Delta$ is negative in the case under consideration) and consequently the larger the number of iterations, the smaller the chance of an opportunity that reduces the quality of the plan being incorporated therein. This ensures that the algorithm stabilizes after a certain number of iterations.

As mentioned above, the simulated annealing technique is a metaheuristic, i.e. a method of controlling an iterative algorithm. It does not define the algorithm proper, and in particular it does not specify how the provisional plan should be derived from the preceding plan (k-1).

Reference 1 specifies a first step which consists in selecting an opportunity from the set of opportunities. This selection is preferably performed in random manner.

Reference 2 indicates the step in which the provisional plan is derived from the preceding plan (of index k-1) and from the selected opportunity.

In a preferred implementation of the invention, this step is performed by the following method:

- if the opportunity is already part of the plan (i.e. if it has already been selected), then the provisional plan is equal to the preceding plan k-1 minus this opportunity;
- if the opportunity is not already part of the plan and if the corresponding request is not saturated in opportunities, then the provisional plan is equal to the preceding plan k-1 plus the new opportunity; and
- if the opportunity is not already part of the plan but if the corresponding request is saturated in opportunities, then the provisional plan is equal to the preceding plan K-1 plus said opportunity and minus another opportunity corresponding to the same request.

Preferably, the opportunity that is removed is the first (chronologically) to have been incorporated in the plan. It would also be possible to select which opportunity is to be removed in random manner, for example.

Reference 3 is a step in which constraints are verified.

Very often, algorithms implementing a technique of the simulated annealing type are not constrained, but on the contrary are relaxed. This means that, at an iteration k, they can accept a plan that does not satisfy all of the constraints.

However, in the context of the invention, the algorithm must be constrained for various reasons:

- it is the only way to be sure that a plan is ultimately obtained which does indeed satisfy all of the constraints, and that is an essential condition in the problem posed; and
- it also makes it possible, at each iteration, to have available a plan that satisfies the constraints. This means that the user can stop the algorithm at any time and still be sure of obtaining a plan which, although not completely optimized, does indeed satisfy all of the constraints.

When the selected opportunity does not enable a plan to be constructed which satisfies all of the constraints, the algorithm returns to step 1 to select an opportunity.

Step 8 consists in testing whether or not to perform a new iteration of the algorithm. This decision is taken as a function of a combination of the following tests:

- the temperature is below a certain threshold;
- the absolute value of the difference between the quality of said provisional plan and the quality of said preceding plan k-1 is below another threshold;
- the number of iterations is above a third threshold;
- the computation time since the said iteration procedure was started is above a fourth threshold; and
- failure count is above a fifth threshold. The failure count is incremented by unity each time a selected opportunity does not enable a plan to be constructed that satisfies all of the constraints, and it is reset to zero each time a selected opportunity leads to a plan that is valid relative to the constraints.

It is also possible to implement a mechanism enabling the algorithm to be stopped at the user's request. As mentioned above, on each iteration, the current plan is a plan that is valid relative to the constraints, even though it is not optimized. Thus, in an implementation of the invention, a stop request by the user forces the temperature to zero.

Thereafter, the algorithm will stabilize in the nearest local minimum of the cost functions That constitutes a compromise between execution time and the quality of the plan obtained by the user.

As mentioned above, a preferred implementation of the method of the invention consists in iterating, starting from a plan that is initially empty. Nevertheless, it is possible to start from a non-empty plan, either to improve the quality of the plan obtained at the end of the process or to improve the speed of convergence on the solution.

For example, one technique for constructing such an initial plan consists in the following steps:

- classifying the requests accordance with a certain criterion;
- for each request, classifying the opportunities in accordance with a certain criterion; and
- constructing an initial plan by taking the requests in order and by giving each request as many opportunities in the initial plan as are required to saturate the request, selecting the opportunities in the order determined by the previously established classification, and while ensuring that each time a new opportunity is added, the plan remains in compliance with all of the constraints.

What is claimed is:

1. A method of controlling an observation satellite, comprising:

a) establishing a plan of requests for said observation satellite according to an iterative method, said requests being received from a particular customer concerning a particular satellite observation, said plan comprising a succession of said requests, said requests being associated with observation opportunities and complying with a plurality of predetermined constraints, said iterative method comprising:

a-1) starting with an initial plan, a-2) performing a plurality of iterations, each iteration k of said plurality of iterations comprising:

a-2-i) selecting a new observation opportunity;

a-2-ii) deriving a provisional plan from the preceding plan k-1 as calculated in the preceding iteration, and from the new observation opportunity;

a-2-iii) making a compliance determination as to whether said provisional plan complies with said plurality of predetermined constraints;

a-2-iv) when said compliance determination indicates compliance with said predetermined constraints, evaluating the quality of said provisional plan; and a-2-v) making an acceptability determination as to whether the provisional plan should be accepted as an accepted plan k, said determination being made as a function of the quality of said provisional plan and the quality of said preceding plan k-1; and a-3) stopping said iterations when stopping conditions are satisfied to provide a final accepted plan k as said plan of requests;

b) controlling said observation satellite to perform observation operations to take said images in accordance with said final accepted plan k; and c) receiving said images by telemetry at one or more ground stations;

wherein said acceptability determination is made by a probabilistic metaheuristic of the simulated annealing type.

2. The method of controlling an observation satellite according to claim 1, wherein said provisional plan is derived as follows:

when said new observation opportunity is already part of said provisional plan, then said provisional plan is equal to said preceding plan k-1 minus said new observation opportunity;

when said new observation opportunity is not already part of said provisional plan and when the corresponding request is not saturated in observation opportunities, then said provisional plan is equal to said preceding plan k-1 plus a said new observation opportunity; and when said new observation opportunity is not already part of said provisional plan but when the corresponding request is saturated in observation opportunities, then said provisional plan is equal to said preceding plan k-1 plus said new observation opportunity and minus another observation opportunity corresponding to the same request.

3. The method of controlling an observation satellite according to claim 1, wherein said other observation opportunity is the first, chronologically, to have been incorporated into said provisional plan.

4. The method of controlling an observation satellite according to claim 1, wherein said initial plan is an empty plan.

5. The method of controlling an observation satellite according to claim 1, wherein said initial plan is obtained by a method comprising the following steps:

classifying the requests in accordance with a certain criterion;

for each request, classifying the observation opportunities in accordance with a certain criterion; and constructing said initial plan by taking the requests in order and giving each request as many observation opportunities in said initial plan as are necessary for saturating said request, said observation opportunities being selected in the order of the previously made classification, said constructing ensuring that on each occasion a new observation opportunity is added, the plan remains in compliance with said plurality of constraints.

6. The method of controlling an observation satellite according to claim 1, wherein, following a stop request from the user, a temperature of the metaheuristic is forced to zero.

7. The method of controlling an observation satellite according to claim 1, wherein said pluralities of opportunities designate each possible instant available to said observation satellite for complying with a given one of said requests.

8. A satellite imaging system, comprising:

an observation satellite, a ground station, and a computer system comprising a processor and a memory under control of said processor, said memory including computer instructions enabling said processor to establish a plan of requests for said observation satellite according to an iterative method, said plan of requests comprising a succession of said requests, said requests being associated with observation opportunities and complying with a plurality of predetermined constraints, said iterative method comprising:

a) starting with an initial plan, b) performing a plurality of iterations, each iteration k of said plurality of iterations comprising:

b-1) selecting a new observation opportunity;

b-2) deriving a provisional plan from the preceding plan k-1 as calculated in the preceding iteration, and from the new observation opportunity;

b-3) making a compliance determination as to whether said provisional plan complies with said plurality of predetermined constraints;

b-4) when said compliance determination indicates compliance with said predetermined constraints, evaluating the quality of said provisional plan; and b-5) making an acceptability determination as to whether the provisional plan should be accepted as an accepted plan k, said determination being made as a function of the quality of said provisional plan and the quality of said preceding plan k-1; and c) stopping said iterations when stopping conditions are satisfied to provide a final accepted plan k as said plan of requests;

said observation satellite performing said observation operations to take said images in accordance with said final accepted plan k; and said ground station receiving said images by telemetry;

wherein said acceptability determination is made by a probabilistic metaheuristic of the simulated annealing type.

9. The satellite imaging system according to claim 8, wherein said provisional plan is derived as follows:

when said new observation opportunity is already part of said provisional plan, then said provisional plan is equal to said preceding plan k-1 minus said new observation opportunity;

when said new observation opportunity is not already part of said provisional plan and when the corresponding request is not saturated in observation opportunities, then said provisional plan is equal to said preceding plan k-1 plus a said new observation opportunity; and when said new observation opportunity is not already part of said provisional plan but when the corresponding request is saturated in observation opportunities, then said provisional plan is equal to said preceding plan k-1 plus said new observation opportunity and minus another observation opportunity corresponding to the same request.

10. The satellite imaging system according to claim 8, wherein said other observation opportunity is the first, chronologically, to have been incorporated into said provisional plan.

11. The satellite imaging system according to claim 8, wherein said initial plan is an empty plan.

12. The satellite imaging system according to claim 8, wherein said initial plan is obtained by a method comprising the following steps:

classifying the requests in accordance with a certain criterion;

for each request, classifying the observation opportunities in accordance with a certain criterion; and constructing said initial plan by taking the requests in order and giving each request as many observation opportunities in said initial plan as are necessary for saturating said request, said observation opportunities being selected in the order of the previously made classification, said constructing ensuring that on each occasion a new observation opportunity is added, the plan remains in compliance with said plurality of constraints.

13. The satellite imaging system according to claim 8, wherein, following a stop request from the user, a temperature of the metaheuristic is forced to zero.

14. The satellite imaging system according to claim 8, wherein said pluralities of opportunities designate each possible instant available to said observation satellite for complying with a given one of said requests.

* * * * *